(12) United States Patent
Akasaka et al.

(10) Patent No.: US 9,524,095 B2
(45) Date of Patent: Dec. 20, 2016

(54) DISPLAY CONTROL DEVICE, DISPLAY CONTROL METHOD, AND PROGRAM

(75) Inventors: Koichi Akasaka, Tokyo (JP); Daisuke Kawamura, Tokyo (JP); Hiromitsu Oka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 229 days.

(21) Appl. No.: 14/112,398

(22) PCT Filed: Apr. 12, 2012

(86) PCT No.: PCT/JP2012/059960
§ 371 (c)(1),
(2), (4) Date: Oct. 17, 2013

(87) PCT Pub. No.: WO2012/147520
PCT Pub. Date: Nov. 1, 2012

(65) Prior Publication Data
US 2014/0040831 A1 Feb. 6, 2014

(30) Foreign Application Priority Data

Apr. 25, 2011 (JP) ................................. 2011-097443

(51) Int. Cl.
*G06F 3/048* (2013.01)
*G06F 3/0488* (2013.01)
(Continued)

(52) U.S. Cl.
CPC ........... *G06F 3/0488* (2013.01); *G06F 3/0482* (2013.01); *G06F 3/04883* (2013.01); *G08C 17/02* (2013.01); *G08C 2201/93* (2013.01)

(58) Field of Classification Search
CPC .. G06F 9/4446; G06F 3/03547; G06F 3/0416; G06F 3/0481–3/04883; G05B 23/0216; H04N 5/4403; H04N 5/443; H04N 21/4126; H04N 21/42207; H04N 21/42224; H04N 21/482
See application file for complete search history.

(56) References Cited

U.S. PATENT DOCUMENTS 8,001,573 B2 8/2011 Sakao et al.
8,046,807 B2 10/2011 Sakao et al.
(Continued)

FOREIGN PATENT DOCUMENTS

JP 07-168855 A 7/1995
JP 2000-285080 A 10/2000
(Continued)

OTHER PUBLICATIONS

Tomoki Watanabe, "An appliance operation logging system with command relay devices" IEICE Technical Report, Jul. 15, 2010 (Jul. 15, 2010), vol. 110, No. 141, pp. 23 to 28.

*Primary Examiner* — Claudia Dragoescu
(74) *Attorney, Agent, or Firm* — Chip Law Group

(57) ABSTRACT

The present technique relates to a display control device, a display control method, and a program that are capable of making inputtable gesture motions easy to notice. A display control unit causes a display unit to display a gesture motion guide in a first state. When a detecting unit for detecting gesture motions detects a predetermined gesture motion, the display control unit changes the guide corresponding to the detected gesture motion to a second state and then causes the display unit to display the guide. The technique according to this disclosure can be applied to an information processing terminal that includes a display unit, for example.

9 Claims, 16 Drawing Sheets

(51) Int. Cl.
*G06F 3/0482* (2013.01)
*G08C 17/02* (2006.01)

(56) References Cited

U.S. PATENT DOCUMENTS

| | | |
|---|---|---|
| 8,156,525 B2 | 4/2012 | Sakao et al. |
| 2009/0153289 A1* | 6/2009 | Hope et al. .................... 340/5.1 |
| 2009/0187824 A1* | 7/2009 | Hinckley et al. ............. 715/711 |
| 2011/0117535 A1* | 5/2011 | Benko ................ G06F 3/04883 434/365 |
| 2012/0169590 A1 | 7/2012 | Sakao et al. |
| 2012/0180002 A1* | 7/2012 | Campbell ............. G06F 17/246 715/863 |

FOREIGN PATENT DOCUMENTS

| | | |
|---|---|---|
| JP | 2005-223931 A | 8/2005 |
| JP | 2005-317041 A | 11/2005 |
| JP | 2007-208547 A | 8/2007 |
| JP | 2010-193107 A | 9/2010 |
| WO | 03-098960 A1 | 11/2003 |

* cited by examiner

DISPLAY CONTROL DEVICE, DISPLAY CONTROL METHOD, AND PROGRAM

CROSS-REFERENCE TO RELATED APPLICATION

The present application is a national phase entry under 35 U.S.C. §371 of International Application No. PCT/JP2012/059960 filed Apr. 12, 2012, published on Nov. 1, 2012 as WO 2012/147520 A1, which claims priority from Japanese Patent Application No. JP 2011-097443 filed in the Japanese Patent Office on Apr. 25, 2011.

TECHNICAL FIELD

The present technique relates to display control devices, display control methods, and programs, and more particularly, to a display control device, a display control method, and a program that make inputtable gesture motions easy to notice.

BACKGROUND ART

A remote controller that remote-controls an apparatus such as a television receiver or a recording/reproducing apparatus normally has buttons for channel numbers and sound level adjustment, and transmits a control signal corresponding to an operated button. Meanwhile, in some cases, a touch panel is placed on a flat upper surface of a remote controller, and a user makes a gesture motion on the touch panel. The gesture motion is detected, and a control signal corresponding to the detected gesture motion is transmitted (see Patent Document 1, for example).

CITATION LIST

Patent Document

Patent Document 1: JP 2010-193107 A (paragraph [0040], FIGS. 2 through 5)

SUMMARY OF THE INVENTION

Problems to be Solved by the Invention

By the method suggested in Patent Document 1, however, it is not easy to determine which gesture motions can be input, and whether an input gesture motion has been correctly recognized and processed.

The present technique has been developed in view of those circumstances, and is to make inputtable gesture motions easy to notice.

Solutions to Problems

A display control device of one aspect of the present technique includes: a display control unit that causes a display unit to display a guide for a gesture motion in a first state; and a detecting unit that detects the gesture motion, the display control unit changing the guide to a second state and causing the display unit to display the guide when the gesture motion is detected, the guide corresponding to the detected gesture motion.

A display control method of the one aspect of the present technique includes the steps of: causing a display unit to display a guide for a gesture motion in a first state; detecting the gesture motion; and changing the guide to a second state and causing the display unit to display the guide, the guide corresponding to the detected gesture motion.

A program of the one aspect of the present technique is for causing a computer to perform an operation including the steps of: causing a display unit to display a guide for a gesture motion in a first state; detecting the gesture motion; and changing the guide to a second state and causing the display unit to display the guide, the guide corresponding to the detected gesture motion.

In the one aspect of the present technique, a gesture motion guide in a first state is displayed on a display unit, and a gesture motion is detected. The portion of the guide corresponding to the detected gesture motion is changed to a second state, and is then displayed on the display unit.

The program to be provided may be transmitted via a transmission medium or may be recorded on a recording medium.

The display control device may be an independent device, or may be an internal block in one device.

Effects of the Invention

According to the one aspect of the present technique, inputtable gesture motions can be made easy to notice.

MODES FOR CARRYING OUT THE INVENTION

[Example Exterior of a Tablet Terminal]

Figure 1:
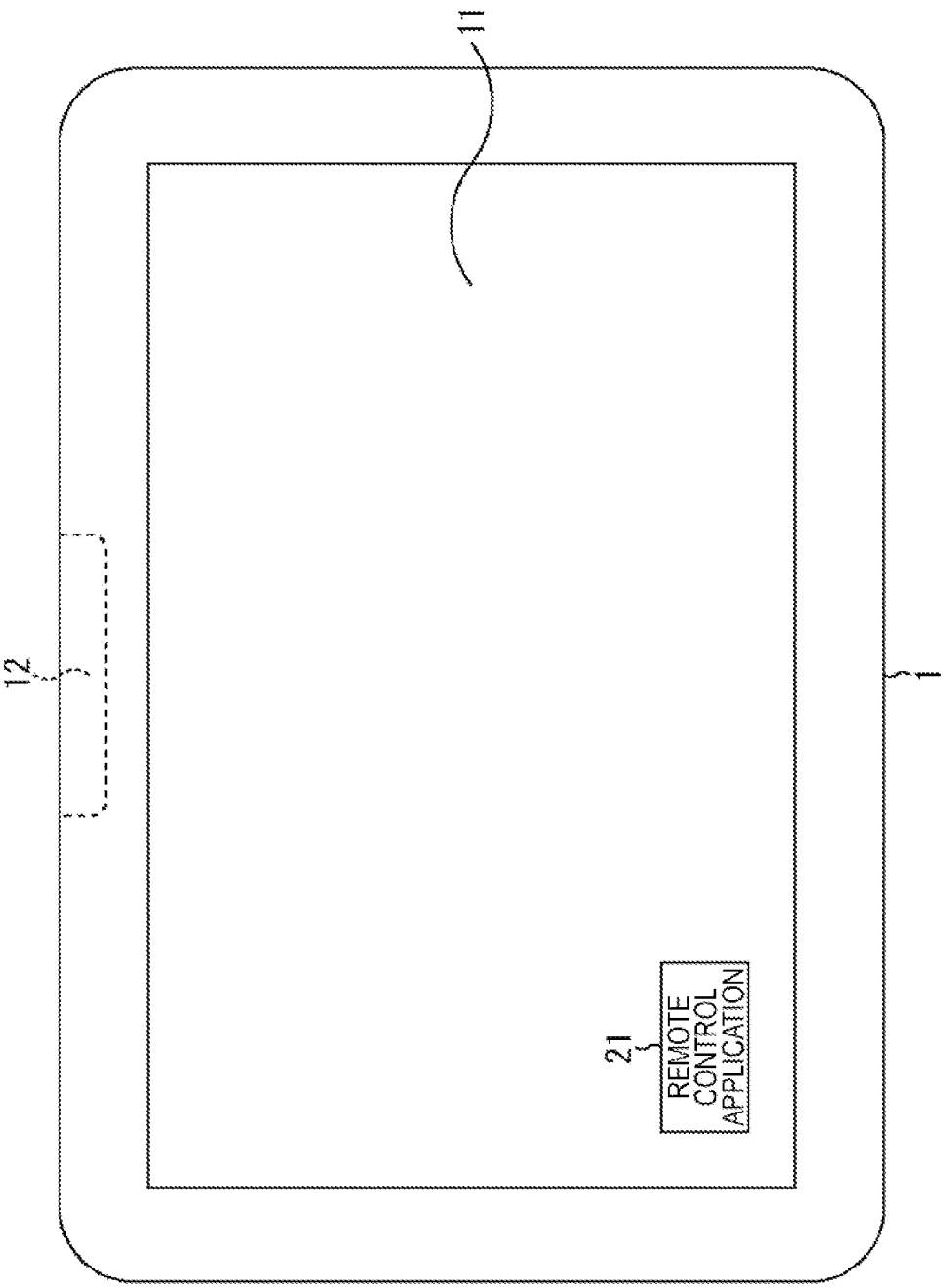
FIG. 1 is a top view showing an example exterior of an embodiment of a tablet terminal in which a display control device according to the present technique is used.

FIG. 1 is a top view showing an example exterior of an embodiment of a tablet terminal in which a display control device of the present technique is used.

The tablet terminal 1 shown in FIG. 1 is an information processing terminal of a thin plate-like shape, and has a touch screen 11 formed on an almost rectangular surface that is the upper surface when placed on a table or the like.

Various kinds of images are displayed on the touch screen 11. A user can make various kinds of (operational) inputs by bringing a finger in proximity to or in contact (touch) with the touch screen 11.

An application (hereinafter referred to as the remote control application) for registering devices being used by the user and performing device control with IR signals is installed in the tablet terminal 1. Examples of the devices registered as control targets include a television receiver, a DVD (Digital Versatile Disc) player, a recording/reproducing apparatus such as a BD (Blu-ray Disc (a registered trademark)) recorder, a STB (Set Top Box), and an amplifier.

At least an icon image 21 of the remote control application, for example, is displayed on the touch screen 11, and the remote control application can be started by the user tapping the icon image 21 of the remote control application.

An IR (Infrared Radiation) communication unit 12 that receives and outputs IR signals is provided in one side surface serving as a long side of the tablet terminal 1 having an almost rectangular shape. Since FIG. 1 is a top view of the tablet terminal 1 seen from above, the portion at which the IR communication unit 12 is provided is indicated by a dashed line. The user sets the tablet terminal 1 so that the IR communication unit 12 faces the device to be controlled. Therefore, in the example illustrated in FIG. 1, the device to be controlled is located in an upper portion of the drawing, and the user is located on the lower side of the drawing.

In the tablet terminal 1 having the above structure, when the remote control application is started, a gesture motion made by the user through the touch screen 11 is detected, and an IR signal corresponding to the gesture motion is transmitted to a predetermined registered device, so that device control can be performed.

[Example Hardware Structure of the Tablet Terminal 1]

Figure 2:
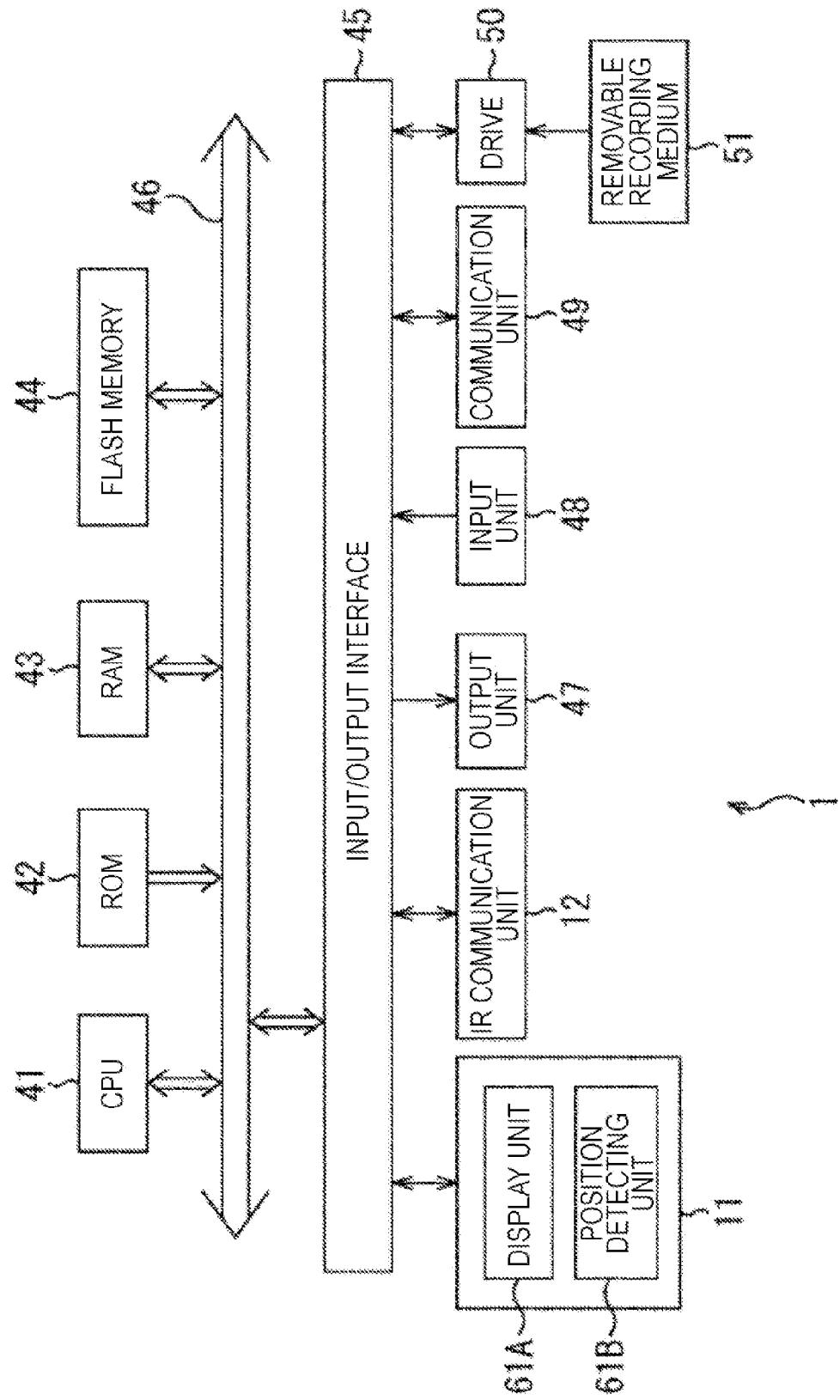
FIG. 2 is a block diagram showing an example structure of the hardware of the tablet terminal.

FIG. 2 is a block diagram showing an example hardware structure of the tablet terminal 1.

The tablet terminal 1 includes a CPU (Central Processing Unit) 41, a ROM (Read Only Memory) 42, a RAM (Random Access Memory) 43, a flash memory 44, and an input/output interface 45, which are connected to one another by a bus 46, and can transmit/receive data, where necessary.

The touch screen 11, the IR communication unit 12, an output unit 47, an input unit 48, a communication unit 49, and a drive 50 are connected to the input/output interface 45.

The touch screen 11 includes a display unit 61A and a position detecting unit 61B. As described above with reference to FIG. 1, various kinds of images can be displayed, and operations can be input by bringing a finger in proximity to or in contact (touch) with the screen.

The display unit 61A is formed with a device (a display device) such as a liquid crystal panel for displaying images, and displays an image in accordance with data supplied via the input/output interface 45.

The position detecting unit 61B is a device having a function that receives (senses) inputs (proximity or contact) from outside, such as a set of a touch panel of an electrostatic type, for example, a light source that emits light, and a sensor that receives the light reflected from an object.

The position detecting unit 61B outputs a position signal indicating the position of proximity or contact (to the input/output interface 45) when an external object, such as a finger of the user or a touch pen or the like being handled by the user, is brought in proximity to or in contact with the screen. The position detecting unit 61B functions as a detecting unit that detects a gesture motion performed in the touch screen 11 by the user.

The touch screen 11 is integrally formed with the above described display unit 61A and the position detecting unit 61B. An image can be displayed on the display unit 61A, and an action input (such as contact or proximity) from outside with respect to the image displayed on the display unit 61A can be received by the position detecting unit 61B.

The position signal that is output from the position detecting unit 61B is supplied to the CPU 41 via the input/output interface 45, and, based on the position signal from the position detecting unit 61B, the CPU 41 recognizes what kind of action input has been made, and can perform various operations in accordance with the action input.

Examples of user actions that can be detected by the position detecting unit 61B include a tapping action performed by touching the screen with a finger for a predetermined period of time and then removing the finger from the screen, a double tapping action performed by touching the screen twice with a finger for a predetermined short period of time, a flicking action performed by flicking the screen in a certain direction with a finger, and a dragging action performed by sliding a finger in a certain direction while keeping the finger in contact with the screen.

The IR communication unit 12 transmits an IR signal corresponding to a device control command under the control of the CPU 41. The IR communication unit 12 also receives an IR signal that is input from outside, and supplies the control command of the received IR signal to the CPU 41 via the input/output interface 45.

The CPU 41 performs various kinds of operations by executing a program that is stored in the ROM 42, or a program that is read from the flash memory 44 or the like and is stored (loaded) into the RAM 43. One of the programs to be executed by the CPU 41 is the remote control application.

The ROM 42 is an EEPROM (Electrically Erasable Programmable ROM), for example, and stores data and programs that need to be maintained even when the power to the tablet terminal 1 turns off.

The RAM 43 stores programs and data that are necessary in the operations of the CPU 41.

Programs such as the remote control application to be executed by the CPU 41, and other data (including programs) are recorded on the flash memory 44.

The output unit 47 is a speaker or an earphone terminal, for example, and outputs sound.

The input unit 48 is a microphone, a microphone terminal, and a voice recognition device, for example, and receives audio (data) inputs from outside.

The communication unit 49 is a communication interface such as a LAN (Local Area Network), and controls wired and wireless communications with external devices.

A removable recording medium 51 that is an optical disk such as a DVD (Digital Versatile Disc), or a semiconductor memory such as a USB memory), can be detachably mounted on the drive 50.

The drive 50 drives the removable recording medium 51 mounted thereon, to record data on the removable recording medium 51 or read data from the removable recording medium 51.

[Flow of Remote Control Application Operation]

Figure 3:
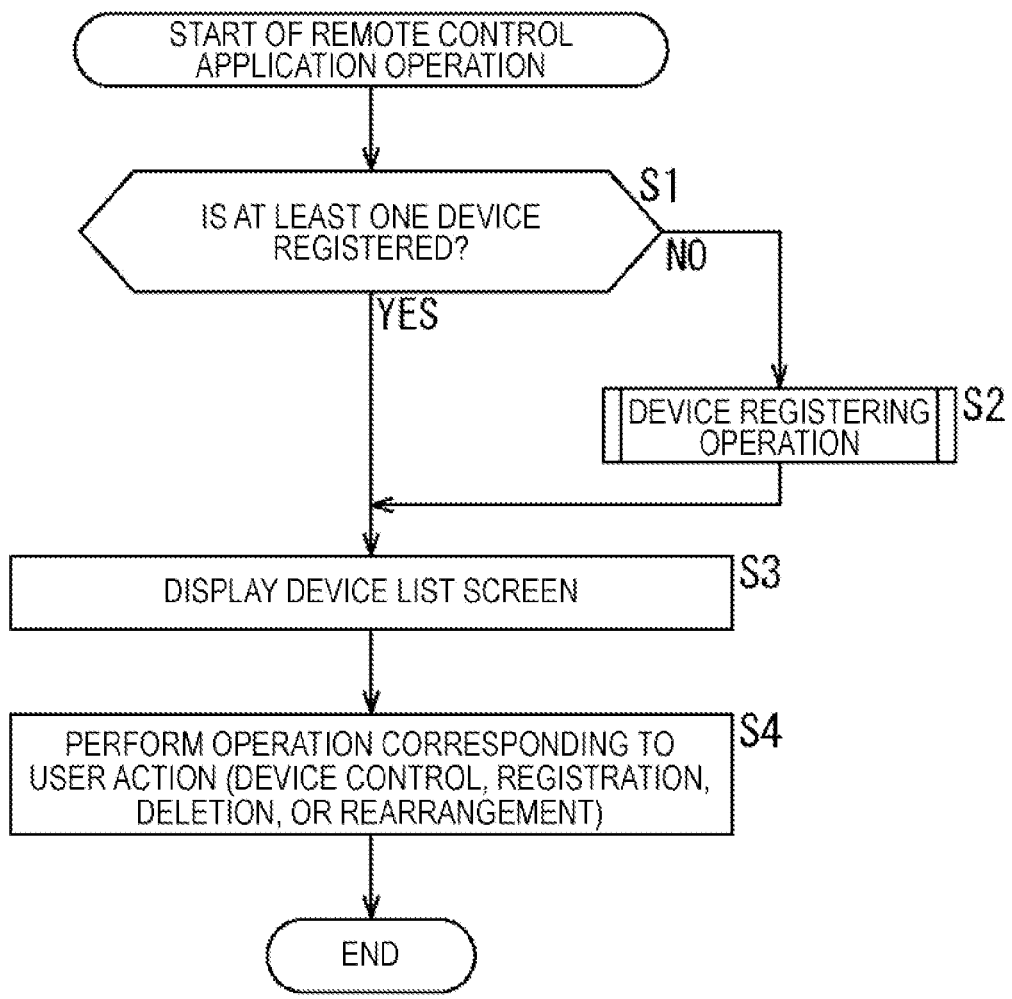
FIG. 3 is a flowchart for explaining a remote control application operation.

Referring now to the flowchart shown in FIG. 3, a remote control application operation to be performed by starting the remote control application is described.

First, in step S1, the remote control application determines whether at least one device is registered as a control target. In a case where the remote control application has not been started even once, no devices are registered as control targets.

If it is determined in step S1 that no devices are registered, the operation moves on to step S2, and the remote control application performs a device registering operation to register a device as a control target. This operation will be described later in detail, with reference to FIG. 5 and others.

If it is determined in step S1 that at least one device is registered as a control target, on the other hand, the operation moves on to step S3, and the remote control application displays a device list screen showing a list of registered control target devices on the display unit 61A.

Figure 4:
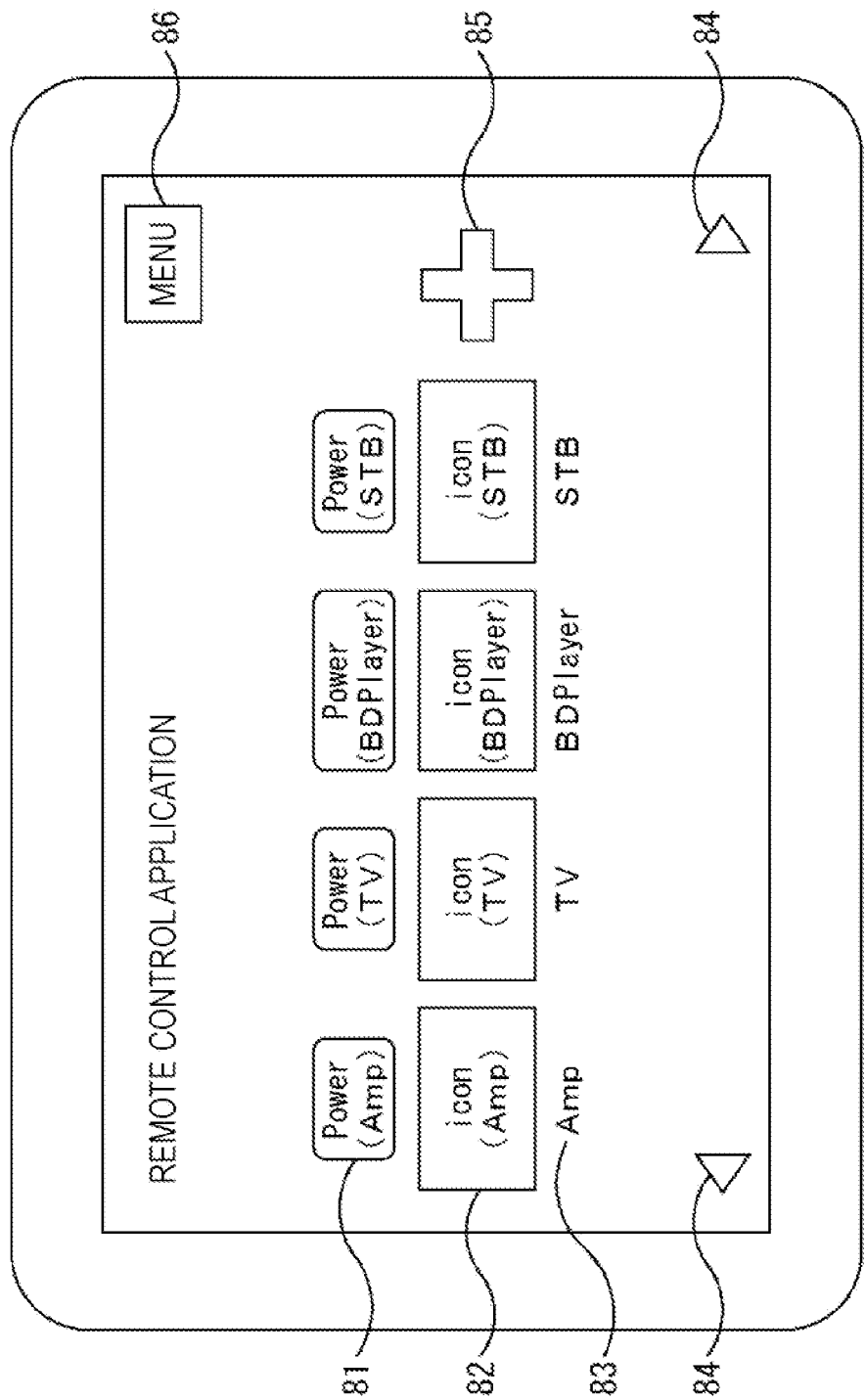
FIG. 4 is a diagram showing an example screen of a device list screen.

FIG. 4 shows an example of the device list screen displayed on the display unit 61A.

On the device list screen, power buttons 81, device image icons 82, and device names 83, together with the title "Remote Control Application" as the name of the application, are displayed for the respective registered control target devices.

In the example shown in FIG. 4, an amplifier, a television receiver (hereinafter referred to simply as the television), a BD player, and an STB are registered as the control target devices. In FIG. 4, only the power button 81, the device image icon 82, and the device name 83 of the amplifier on the leftmost side are denoted by reference numerals, and reference numerals for the other devices are not shown.

When a user wishes to operate the television, for example, the device image icon 82 of the television should be touched. To turn on or off the power to the television, the user should touch the power button 81 of the television. That is, each power button 81 is operated (touched) when the power to the corresponding registered device is to be turned on or off. Each device image icon 82 is operated when the corresponding registered device is to be controlled.

The device list screen can display the power buttons 81 through the device names 83 of a predetermined number of devices (four devices in the example shown in FIG. 4) on one screen. If the number of registered devices exceeds the number of devices that can be displayed on one screen, page turning icons 84 are displayed so that the power buttons 81 through the device names 83 of non-displayed devices can be displayed by touching a page turning icon 84 or performing a dragging action to the right or left on the screen.

The device list screen also displays a device adding button 85 to be operated to register a new device, and a menu button 86. As the device registering operation of step S2 can be performed by the user operating (selecting) the device adding button 85, devices can be added afterwards. By operating the menu button 86, the registered devices can be rearranged, or the remote control application can be ended, for example.

After the device list screen shown in FIG. 4 is displayed on the display unit 61A by performing the operation of step S3 shown in FIG. 3, the remote control application in step S4 performs a user action responding operation that is an operation corresponding to a user action performed in the device list screen.

In the user action responding operation, a registered device can be controlled, a control target device can be registered or deleted, the registered devices can be rearranged, or registered information can be changed, for example.

In an operation to delete a registered device, a long-press on the device image icon 82 of the target to be deleted from the device list screen shown in FIG. 4 causes items such [Delete] and [Edit devices] to appear, and the user can delete the registered device by selecting the item [Delete]. Also, by selecting the item [Edit devices], the user can edit (change) the contents of the registered devices. The method of deleting or changing the registered devices is not limited to the above, and the registered devices may be deleted or edited with the menu button 86 or the like.

After the user action responding operation of step S4 is performed, the menu button 86 is selected, and [End remote control application] is lastly selected from the displayed items. The operation shown in FIG. 3 then comes to an end.

[Flow of the Device Registering Operation]

Figure 5:
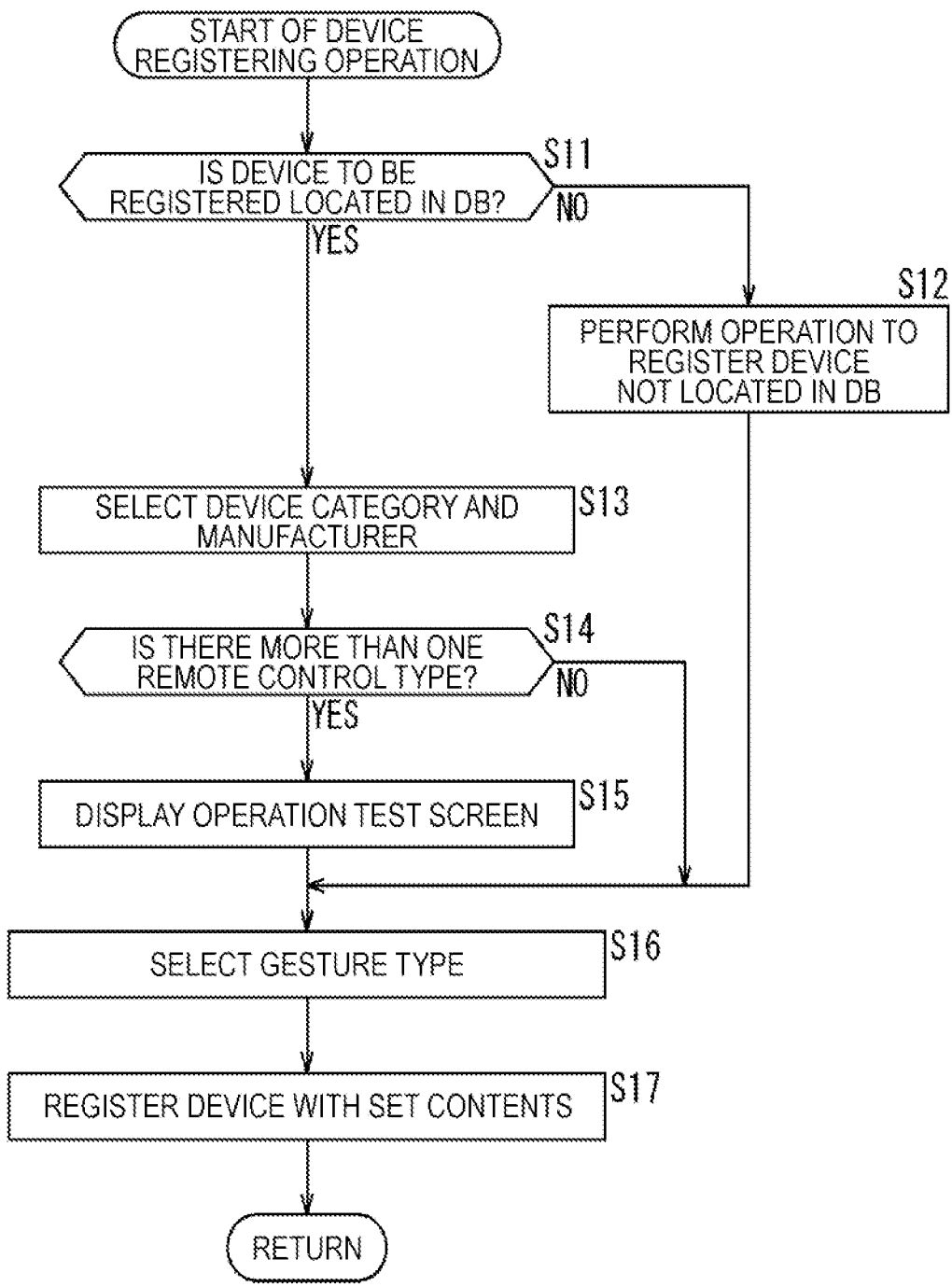
FIG. 5 is a flowchart for explaining a device registering operation.

FIG. 5 is a flowchart of the device registering operation performed as step S2 shown in FIG. 3. As described above, when the device adding button 85 is operated (selected) in the device list screen by the user, this operation is also performed.

First, in step S11, the remote control application determines whether the device to be added is registered in a database (DB) stored in the flash memory 44.

The flash memory 44 stores the database in which the operation buttons of the remote controllers authorized by the manufacturers of the devices predicted to be registered are associated with the IR signals (remote control codes) to be transmitted when the operation buttons are operated. Accordingly, the user can easily register a device that exists in the database.

Figure 6:
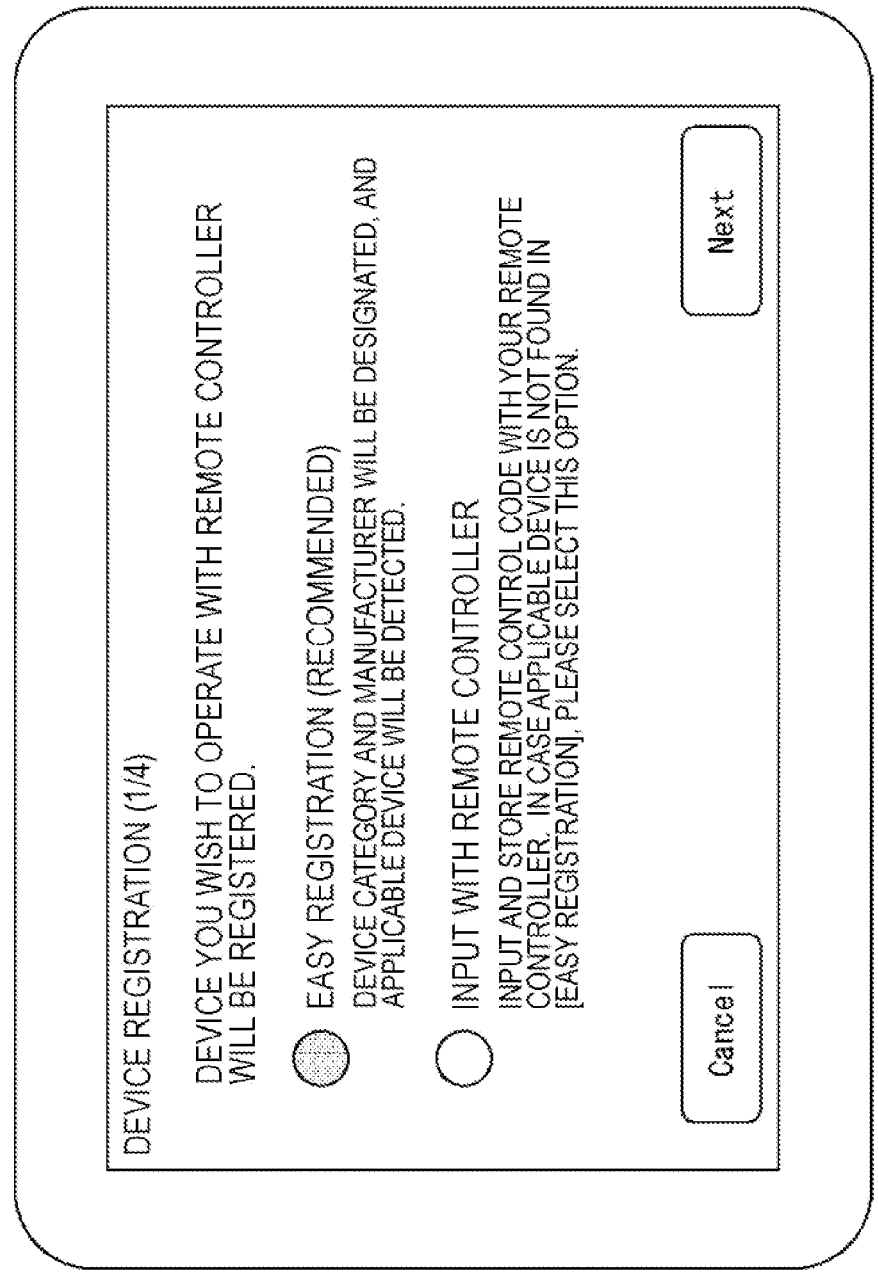
FIG. 6 is a diagram showing an example of a device registration screen.

A check is made to determine whether the device to be registered is a device existing in the database based on the user action received by the remote control application displaying a first device registration screen shown in FIG. 6 on the display unit 61A.

In the first device registration screen shown in FIG. 6, one of the following device registration methods is selected (touched) by pressing a radio button: "Easy device registration" for registering a device from the database by designating the category, the manufacturer, and the like of the device; and "Teaching by remote control" for registering a device that does not exist in the database.

When "Easy device registration" in the first device registration screen shown in FIG. 6 is selected by the user, the remote control application in step S11 determines that the device to be registered is a device existing in the database. When "Teaching by remote control" in the first device registration screen is selected by the user, on the other hand, the remote control application in step S11 determines that the device to be registered does not exist in the database.

If the device to be registered is determined to be a device that does not exist in the database in step S11, the operation moves on to step S12, and a device registering operation without the database is performed.

In the device registering operation without the database, a remote controller authorized by the manufacturer of the registration target is placed in a position facing the IR communication unit 12 of the tablet terminal 1. After designating an operation button the user wishes to register in the screen of the remote control application, the user presses the desired operation button of the manufacturer-authorized remote controller placed in the facing position. The IR communication unit 12 receives the IR signal transmitted from the manufacturer-authorized remote controller, and the remote control application stores (learns) the IR signal received by the IR communication unit 12 as the IR signal of the designated operation button. The above operation is repeatedly performed with respect to the operation button the user wishes to register.

If the device to be registered is determined to be a device existing in the database in step S11, on the other hand, the operation moves on to step S13, and the remote control application prompts the user to select the category and the manufacturer of the device.

Figure 7:
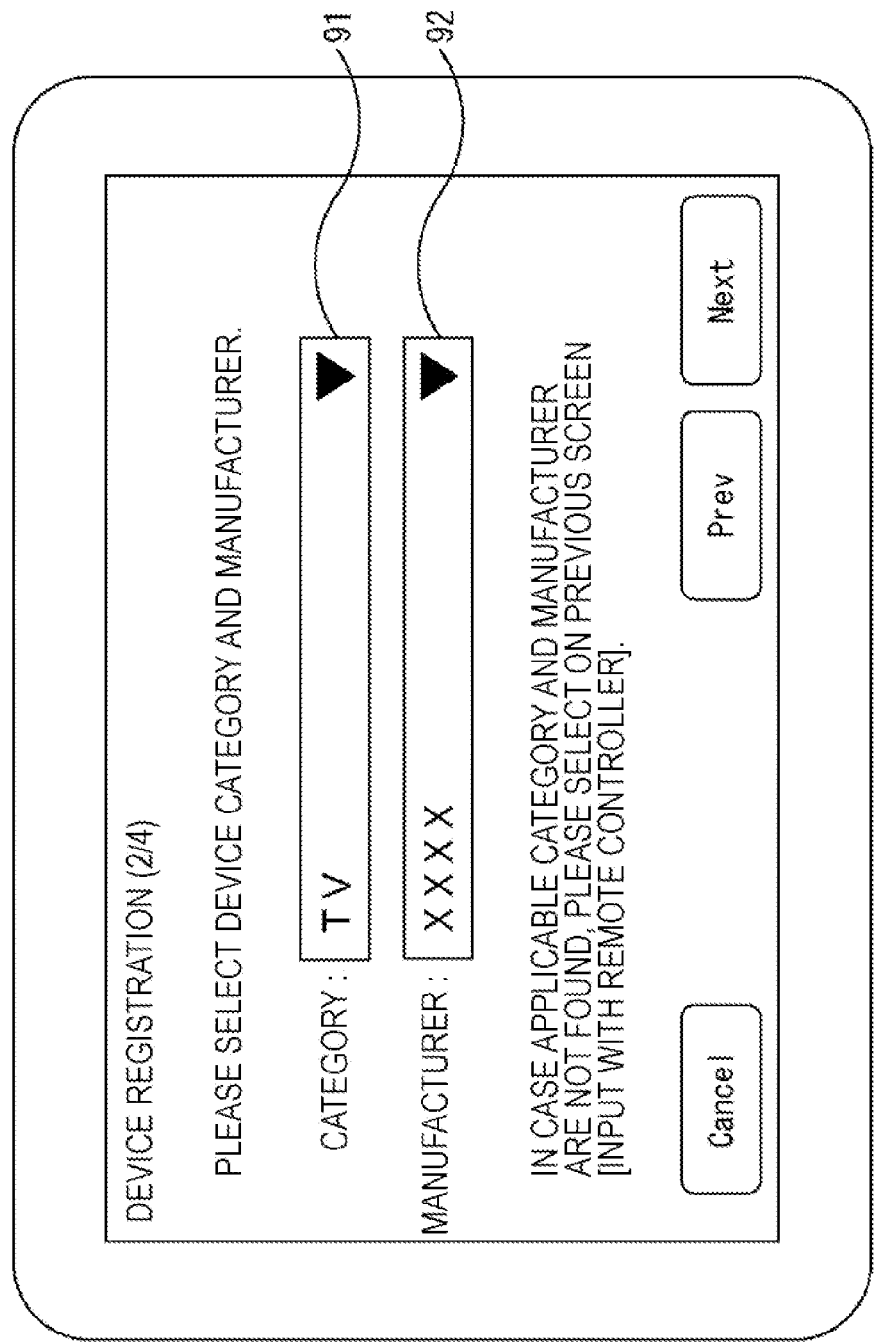
FIG. 7 is a diagram showing an example of a device registration screen.

FIG. 7 shows an example of a second device registration screen that is displayed on the display unit 61A by the remote control application in the operation of step S13.

In the second device registration screen, a pull-down menu 91 for indicating the category of the device to be registered, and a pull-down menu 92 for indicating the manufacturer are provided. The category and the manufacturer of the desired device are designated from among the items displayed in the pull-down menu 91 or 92. Examples of device categories that can be designated include television (TV), amplifier, DVD player, BD player, and BD recorder.

After step S13 of FIG. 5, the remote control application in step S14 determines whether there is more than one remote controller type. In some cases, more than one remote controller type exists with respect to a designation of a manufacturer and a device category. In a case where more than one remote controller type exists, it is necessary to specify a remote controller type, since the IR signal to be transmitted varies with remote controller types.

If it is determined in step S14 that there is more than one remote controller type, the operation moves on to step S15, and the remote control application displays an operation test screen, and sequentially performs operation tests for possible remote controller types. In the operation test screen, the user is prompted to operate a predetermined operation button and input a result indicating whether the operation has been performed in the control target device. In this manner, a check is made to determine which the remote controller type corresponds to an authorized remote controller.

If it is determined in step S14 that there is only one remote controller type, the operation of step S15 is skipped, and moves on to step S16. The operation of step S16 is also performed after the operation of step S12 or S15.

In step S16, the remote control application prompts the user to select a gesture motion type.

Figure 8:
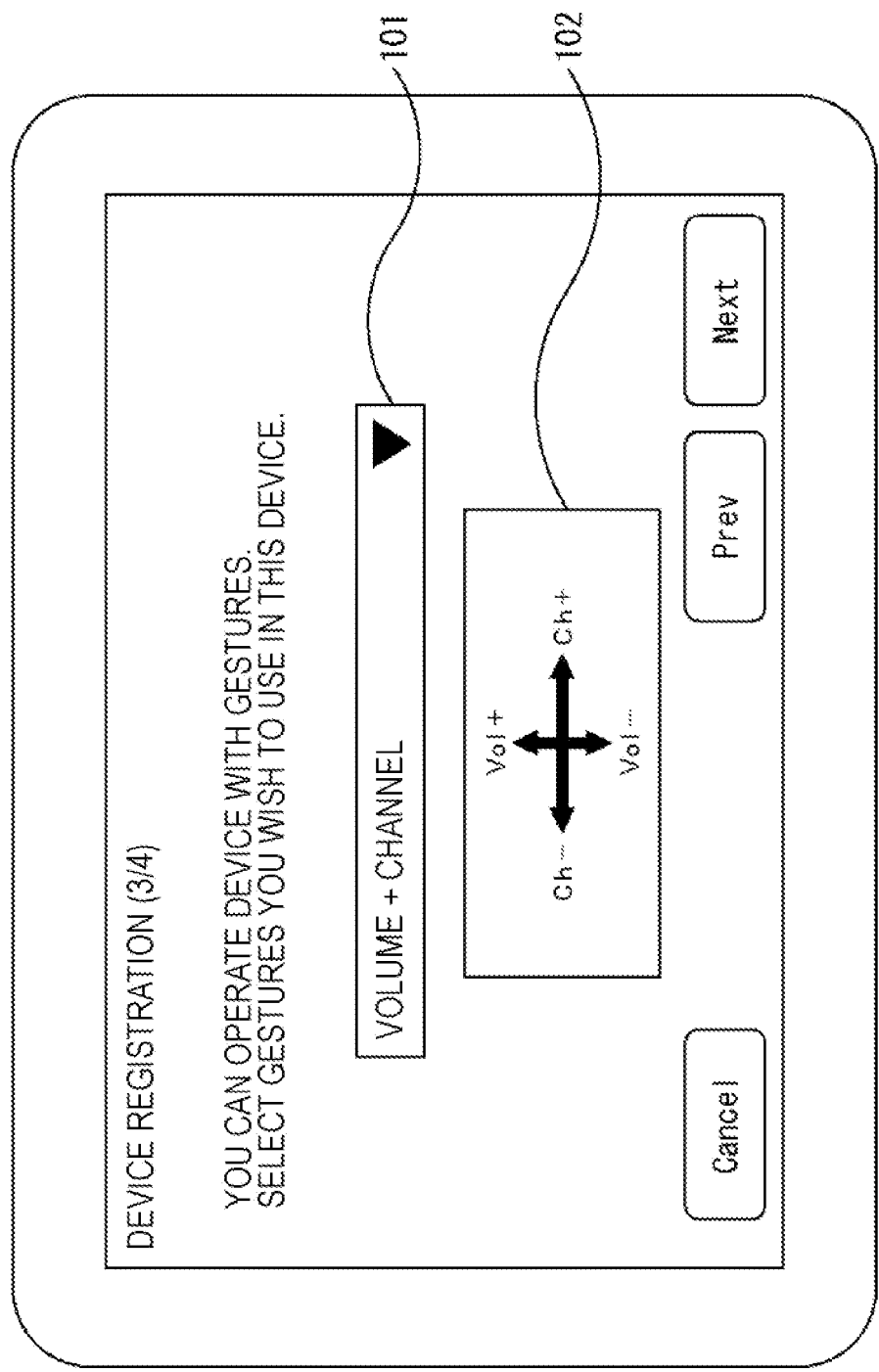
FIG. 8 is a diagram showing an example of a device registration screen.

FIG. 8 shows an example of a third device registration screen that is displayed on the display unit 61A by the remote control application in step S16. The third device registration screen is a screen for prompting the user to select a gesture motion type.

The third device registration screen displays a pull-down menu 101 for selecting a gesture motion type. A gesture motion guide image 102 is also displayed below the pull-down menu 101 in accordance with the gesture motion type selected from the pull-down menu 101.

More than one gesture motion type that can be selected from the pull-down menu 101 is prepared in accordance with the category of the device. In this embodiment, there are three prepared types: Type 1, Type 2, and Type 3. Type 1 is a type that can control only sound level with gesture motions, and a typical control target device of Type 1 is an amplifier. Type 2 is a type that can control sound level and channels with gesture motions, and a typical control target device of Type 2 is a television. Type 3 is a type that can control sound level and the running system (such as replaying, fast-forwarding, and fast-rewinding) with gesture motions, and a typical control target device of Type 3 is a recording/reproducing device such as a BD player or a BD recorder.

In the example screen shown in FIG. 8, a gesture motion of Type 2 is selected from the pull-down menu 101, and the gesture motion guide image 102 displays the Type-2 guide.

Figure 9:
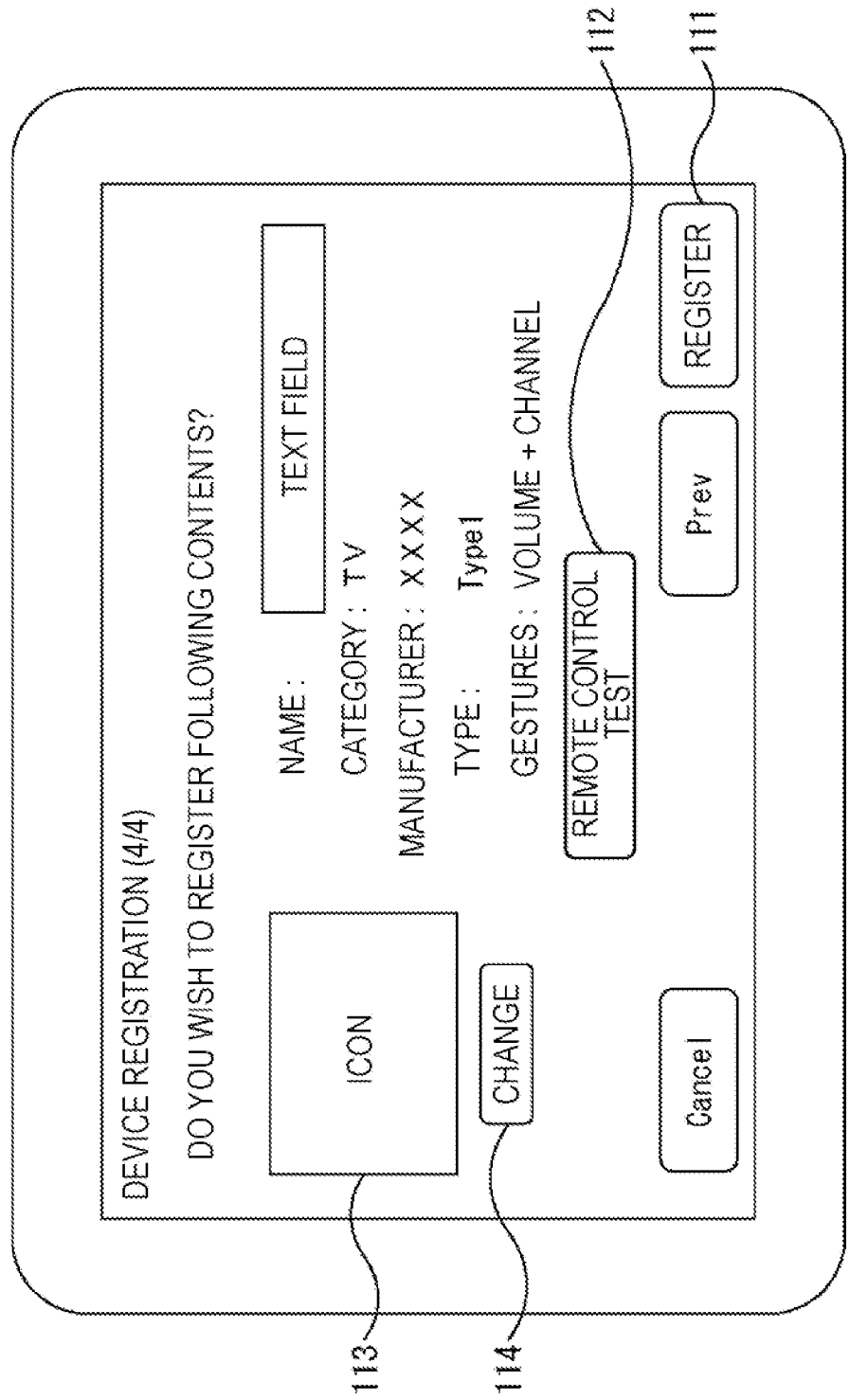
FIG. 9 is a diagram showing an example of a device registration screen.

After a gesture motion type is selected by the user through the operation of step S16, the remote control application in step S17 displays a fourth device registration screen shown in FIG. 9 on the display unit 61A, so as to confirm the registered contents. When a registration button 111 in the fourth device registration screen shown in FIG. 9 is operated, the remote control application registers the device with the set contents, and ends the operation.

The fourth device registration screen shown in FIG. 9 displays the contents that have been set in the above described operations of steps S11 through S16.

The default name corresponding to the category of the designated device is set in the column of "Name". The name set in this column is displayed as the device name 83 in the device list screen. A remote-control operation test button 112 is the button to be operated when an operation test is conducted with the registered contents.

The default icon corresponding to the category of the designated device is set in an icon display portion 113. The icon set in this portion is displayed as the device image icon 82 in the device list screen. When the default icon is changed, an icon change button 114 is touched. As the icon change button 114 is touched, icons prepared in advance are displayed, and the user can change the icon to a desired icon by selecting the desired icon from the displayed icons.

In the above manner, a control target device is registered in the remote control application. The set contents of each registered device are stored into the flash memory 44.

[Method of Performing Device Control in the Remote Control Application]

Next, an operation method to be implemented in the remote control application in a case where an IR signal is transmitted to a registered device, and predetermined control is performed is described.

In the device list screen shown in FIG. 4, the television is selected as the control target device if the user touches the device image icon 82 of the television, for example. Once the control target device is determined, the remote control application displays a gesture screen or a full remote control screen of the control target device on the display unit 61A.

Figure 10:
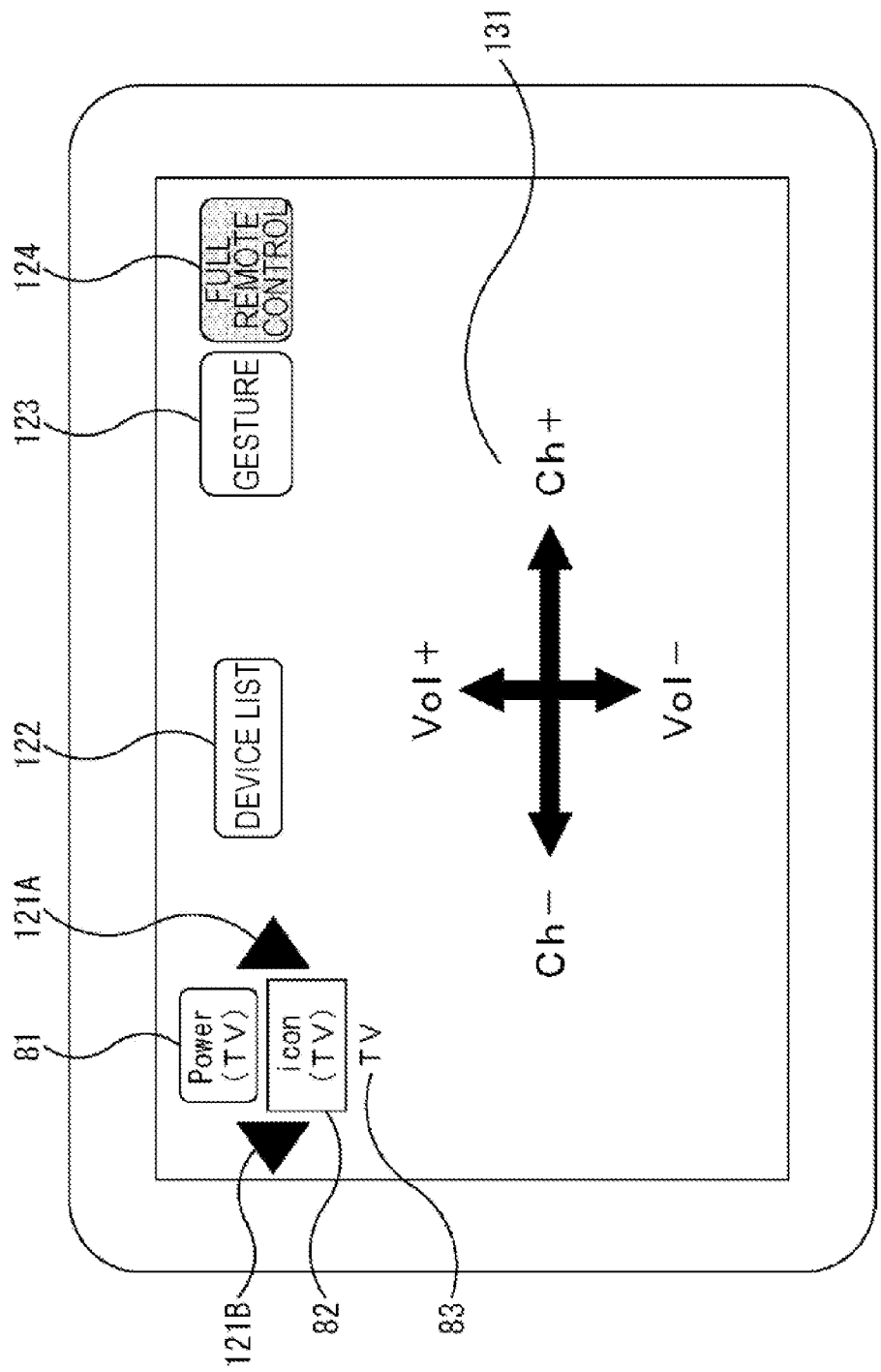
FIG. 10 is a diagram showing an example of a gesture screen of a television.
Figure 11:
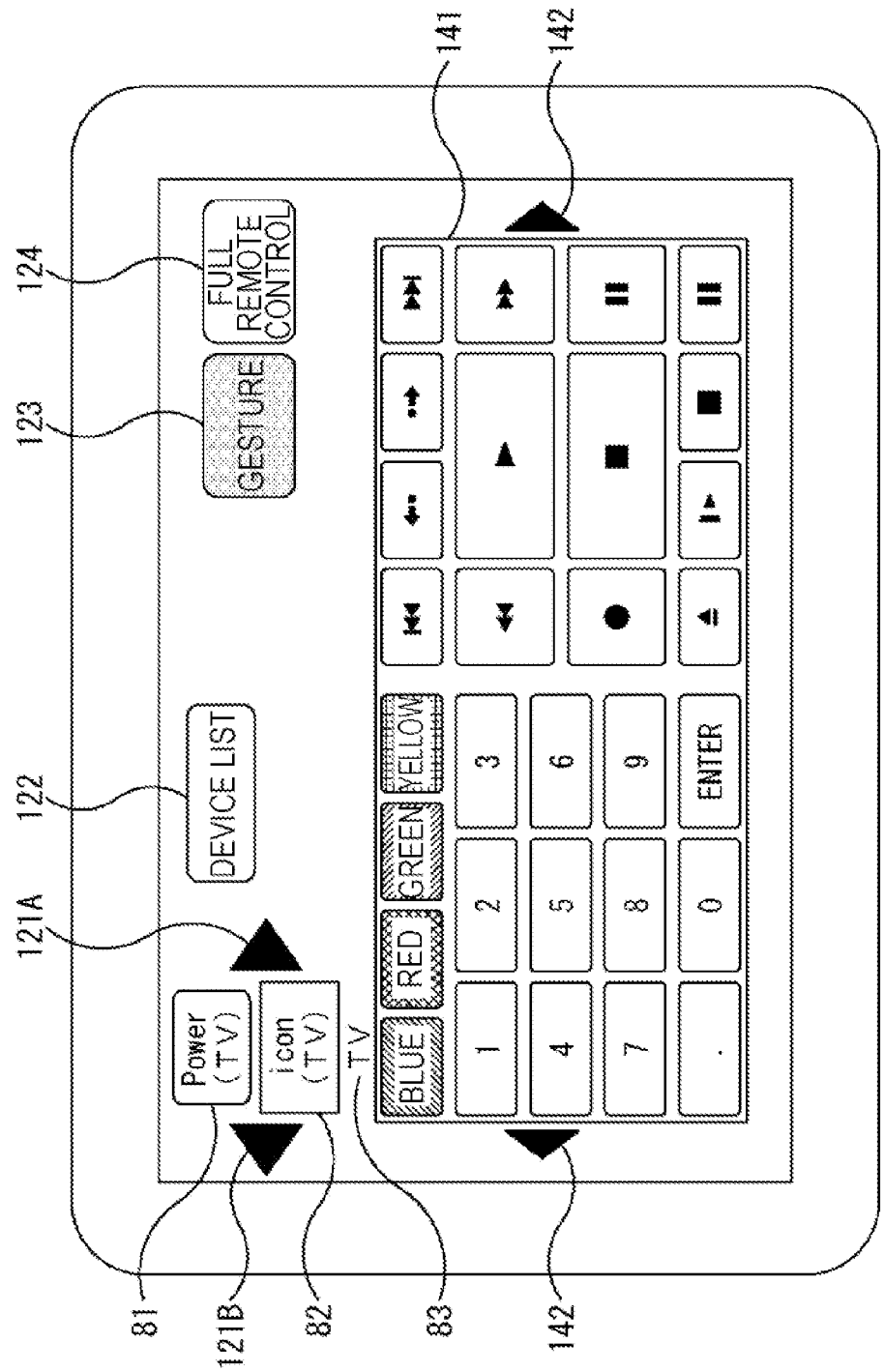
FIG. 11 is a diagram showing an example of a full remote control screen of a television.

FIG. 10 shows an example of the gesture screen in a case where the control target device is the television, and FIG. 11 shows an example of the full remote control screen in a case where the control target device is the television.

Both a gesture screen and a full remote control screen can be selectively displayed with respect to each control target device. The gesture screen is a screen in which an operation (device control) frequently used depending on the device category can be performed with a simple gesture motion, and the full remote control screen is a screen in which all the operation buttons of the device are displayed and are allowed to be operated.

It is possible to determine beforehand which one of the gesture screen and the full remote control screen is preferentially displayed first, and, in this embodiment, the gesture screen is displayed when the user touches the device image icon 82.

Both the gesture screen shown in FIG. 10 and the full remote control screen shown in FIG. 11 display the power button 81 and the device name 83 of the television, device switching buttons 121A and 121B, a device list button 122, a gesture screen switching button 123, and a full remote control screen switching button 124.

When the rightward device switching button 121A is selected, the control target is switched to the BD player to the right of the television in the device list screen shown in FIG. 4, and the gesture screen of the BD player shown FIG. 13, which will be described later, is displayed. When the leftward device switching button 121B is selected, the control target is switched to the amplifier to the left of the television in the device list screen shown in FIG. 4, and the gesture screen of the amplifier shown FIG. 12, which will be described later, is displayed.

The device list button 122 is operated to return to the device list screen shown in FIG. 4. The gesture screen switching button 123 is operated to switch the display to the gesture screen, and the full remote control screen switching button 124 is operated to switch the display to the full remote control screen. In the gesture screen shown in FIG. 10, the full remote control screen switching button 124 is shown as a shaded portion. In the full remote control screen shown in FIG. 11, the gesture screen switching button 123 is shown as a shaded portion.

The gesture screen shown in FIG. 10 and the full remote control screen shown in FIG. 11 differ from each other in that a gesture motion guide 131 is displayed in the gesture screen, and an operation key screen 141 is displayed in the full remote control screen.

The gesture motion guide 131 shown in FIG. 10 is the Type-2 guide 131 set in the pull-down menu 101 in the third device registration screen shown in FIG. 8.

The Type-2 guide 131 schematically shows that a command [Vol+] for increasing sound level is assigned to an upward sliding action, a command [Vol−] for decreasing sound level is assigned to a downward sliding action, a command [Ch+] for switching channels in the plus direction is assigned to a rightward sliding action, and a command [Ch−] for switching channels in the minus direction is assigned to a leftward sliding action.

Here, a sliding action may be a flicking action or a dragging action, and the remote control application outputs different commands (IR signals) in response to a flicking action and a dragging action. When sensing a sliding action in which the contact time of a finger of the user is shorter than a certain period of time (0.7 second, for example), the remote control application determines that a flicking action has been performed. When sensing a sliding action in which the contact time of a finger of the user is equal to or longer than the certain period of time (0.7 second, for example), the remote control application determines that a dragging action has been performed.

When determining that a flicking action has been performed, the remote control application transmits the assigned command [Vol+], [Vol−], [Ch+], or [Ch−] once. When determining that a dragging action has been performed, on the other hand, the remote control application continuously transmits the assigned command [Vol+], [Vol−], [Ch+], or [Ch−] until sensing removal of the finger of the user from the touch screen 11.

The remote control application causes the output unit 47 to output different operation sounds (melodies) between one-time transmission and continuous transmission, and notifies the user of command transmission. In the case of one-time transmission, an operation sound is output when the command is transmitted. In the case of continuous transmission, an operation sound is output when the continuous transmission starts.

The operation key screen 141 in the full remote control screen shown in FIG. 11 includes the same operation keys as the operation buttons normally provided on a remote controller. Depending on each registered device, the remote control application does not display the operation keys having no IR signals assigned thereto or displays those operation keys in gray, so that a check can be made to determine that there are no IR signals assigned thereto. In a case where there are too many operation key types to be displayed in one screen, non-displayed operation keys can be made to appear with a page turning button 142.

Figure 12:
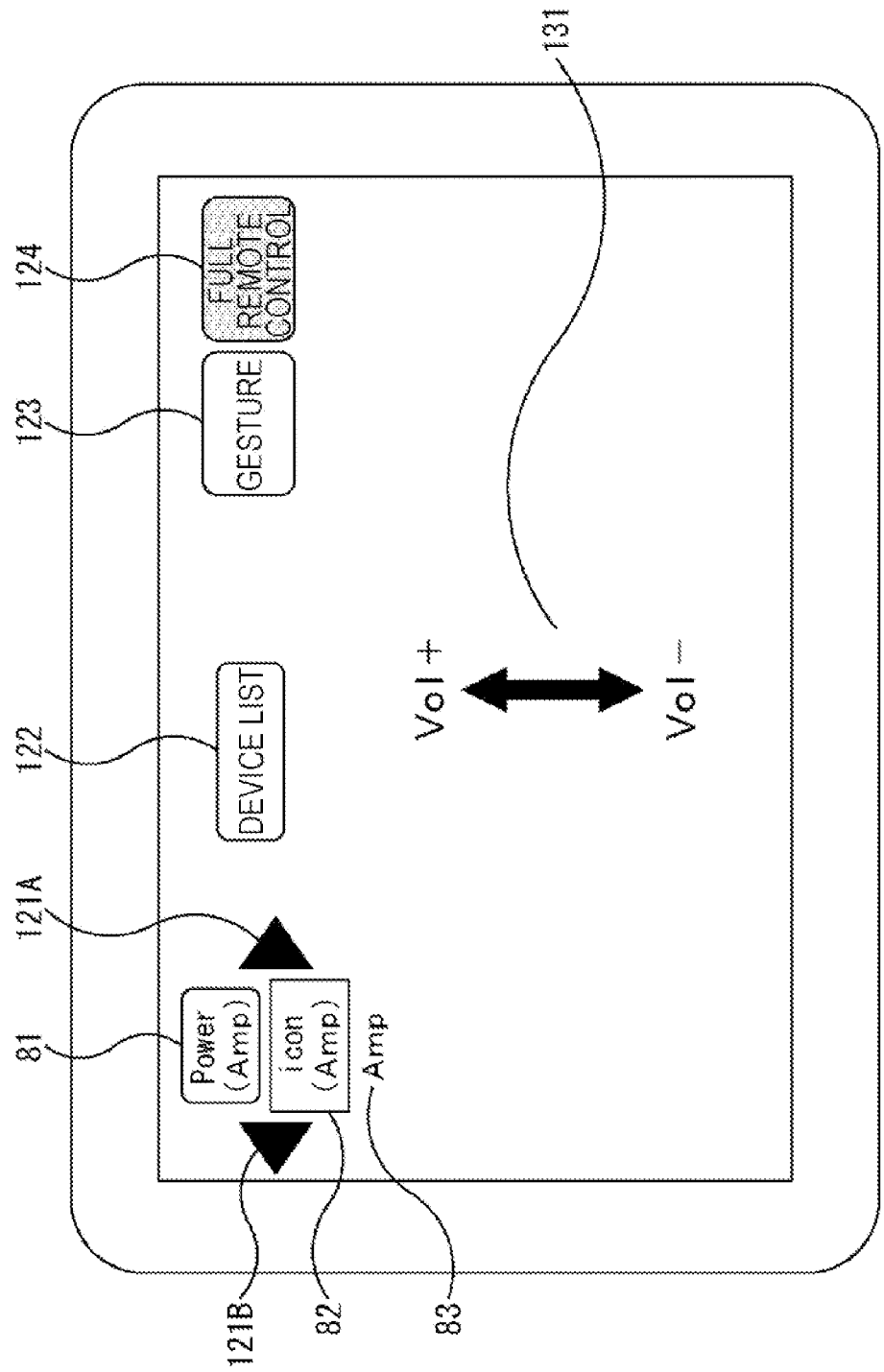
FIG. 12 is a diagram showing an example of a gesture screen of an amplifier.

When the leftward device switching button 121B is selected by the user in the gesture screen shown in FIG. 10, the control target is switched to the amplifier to the left of the television in the device list screen shown FIG. 4, and the gesture screen of the amplifier shown FIG. 12 is displayed.

The gesture screen guide 131 of the amplifier shown in FIG. 12 is a Type-1 guide.

The Type-1 guide 131 schematically shows that a command [Vol+] for increasing sound level is assigned to an upward sliding action, and a command [Vol−] for decreasing sound level is assigned to a downward sliding action. There are no commands assigned to a rightward sliding action and a leftward sliding action. The difference in command output between a flicking action and a dragging action (one-time transmission and continuous transmission), and the difference in operation sound between one-time transmission and continuous transmission are the same as those with the above described Type 2, and thereof, explanation of them is not repeated herein.

Figure 13:
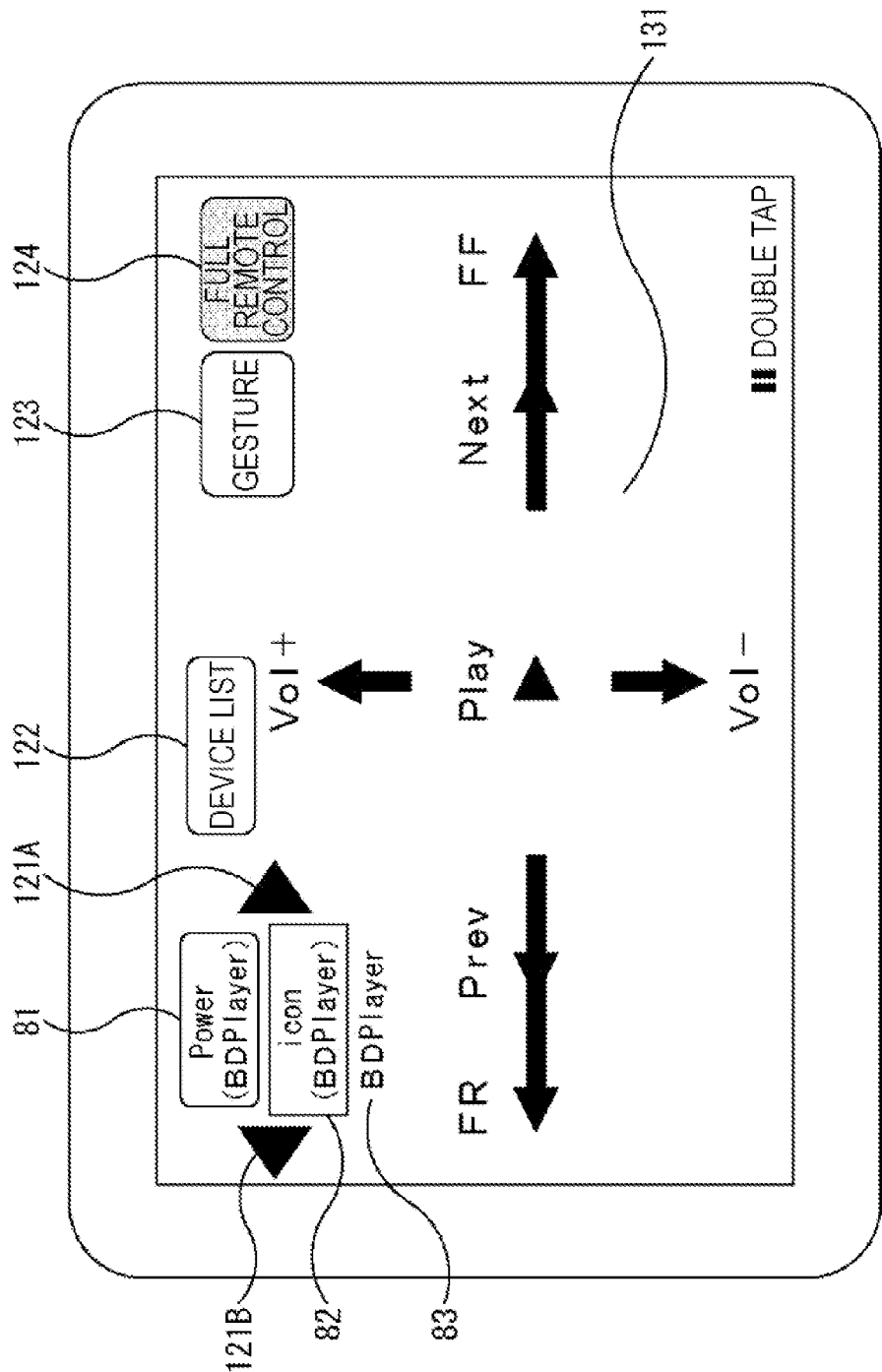
FIG. 13 is a diagram showing an example of a gesture screen of a BD player.

When the rightward device switching button 121A is selected by the user in the gesture screen shown in FIG. 10, the control target is switched to the BD player to the right of the television in the device list screen shown FIG. 4, and the gesture screen of the BD player shown FIG. 13 is displayed.

The gesture screen guide 131 of the BD player shown in FIG. 13 is a Type-3 guide.

The Type-3 guide 131 schematically shows that a command [Vol+] for increasing sound level is assigned to an upward sliding action, and a command [Vol−] for reducing sound level is assigned to a downward sliding action. The commands [Vol+] and [Vol−] are the same as those of the above described Type 2, and therefore, explanation of them is not repeated herein.

The Type-3 guide 131 also schematically shows that a command [Next] for moving on to the top of the next title/chapter/track is assigned to a rightward flicking action, and a command [FF] for fast-forwarding is assigned to a rightward dragging action.

The Type-3 guide 131 further schematically shows that a command [Prev] for returning to the top of the previous title/chapter/track is assigned to a leftward flicking operation, and a command [FR] for fast-rewinding is assigned to a leftward dragging action.

A rightward or leftward flick action is performed to transmit the command [Next] or [Prev] once, and a rightward or leftward dragging action is performed to continuously transmit the command [FF] or [FR]. The difference in operation sound between one-time transmission and continuous transmission is the same as that of the above described Type 2.

In Type 3, a command [Play] for playing is further assigned to a tapping action, and a command [Pause] for pausing is assigned to a double tapping action.

[Example of a Gesture Motion]

Next, an example operation to be performed when a predetermined gesture motion is made in the case of the Type-2 guide 131 is described.

Figure 14:
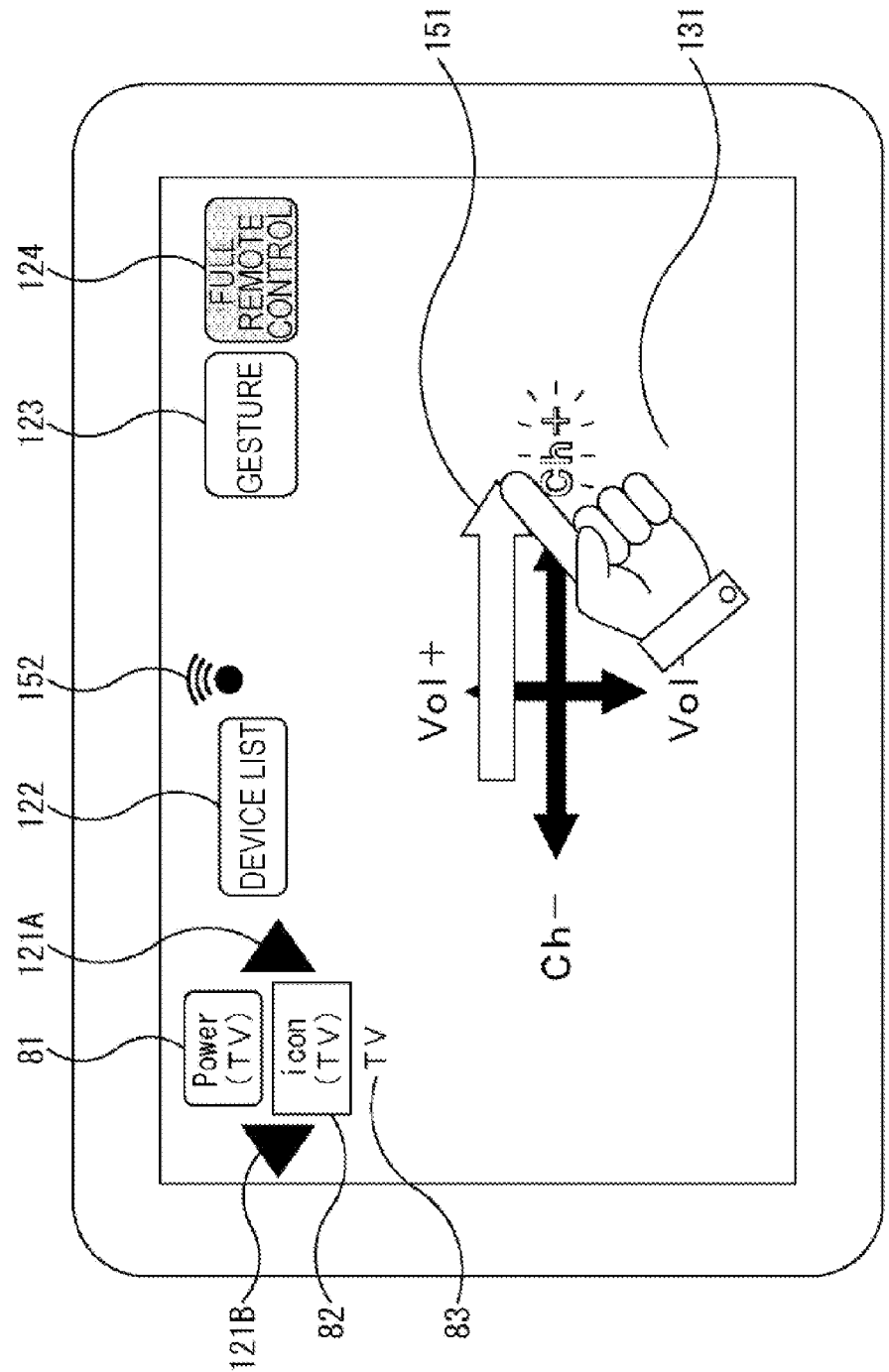
FIG. 14 is a diagram for explaining a command transmitting operation with a gesture motion.

FIG. 14 shows an example display on the touch screen 11 in a case where the user performs a rightward flicking action that is a gesture motion.

The remote control application detects the gesture motion (the flicking action) made by the user, and causes the display unit 61A to display the trajectory 151 of the detected position of the finger. It should be noted that the user does not need to make a gesture motion precisely on the guide 131, and the remote control application is capable of detecting gesture motions made in any positions on the touch screen 11. For example, a rightward flicking action performed in an area below the characters [Vol+] can be detected.

The remote control application then displays the portion (Ch+) of the command to be transmitted in the gesture motion guide 131 in a blinking manner so that the user can see which command is to be transmitted to the device in accordance with the detected gesture motion.

The remote control application further causes the IR communication unit 12 to transmit (the IR signal of) the command corresponding to the detected gesture motion, and displays, for a predetermined period of time, a communication lamp 152 indicating that a command is being transmitted. The display (lighting) of the communication lamp 152 is merely for making the user notice the command transmission. Therefore, the actual command transmission period does not need to be equivalent to the display period of the communication lamp 152.

In a case where the remote control application detects a dragging action, an indication that a finger is being detected is displayed by showing a wavelike pattern around the center of the position of the finger in continuous contact with the screen after the trajectory 151 of the detected position of the finger is displayed.

Figure 15:
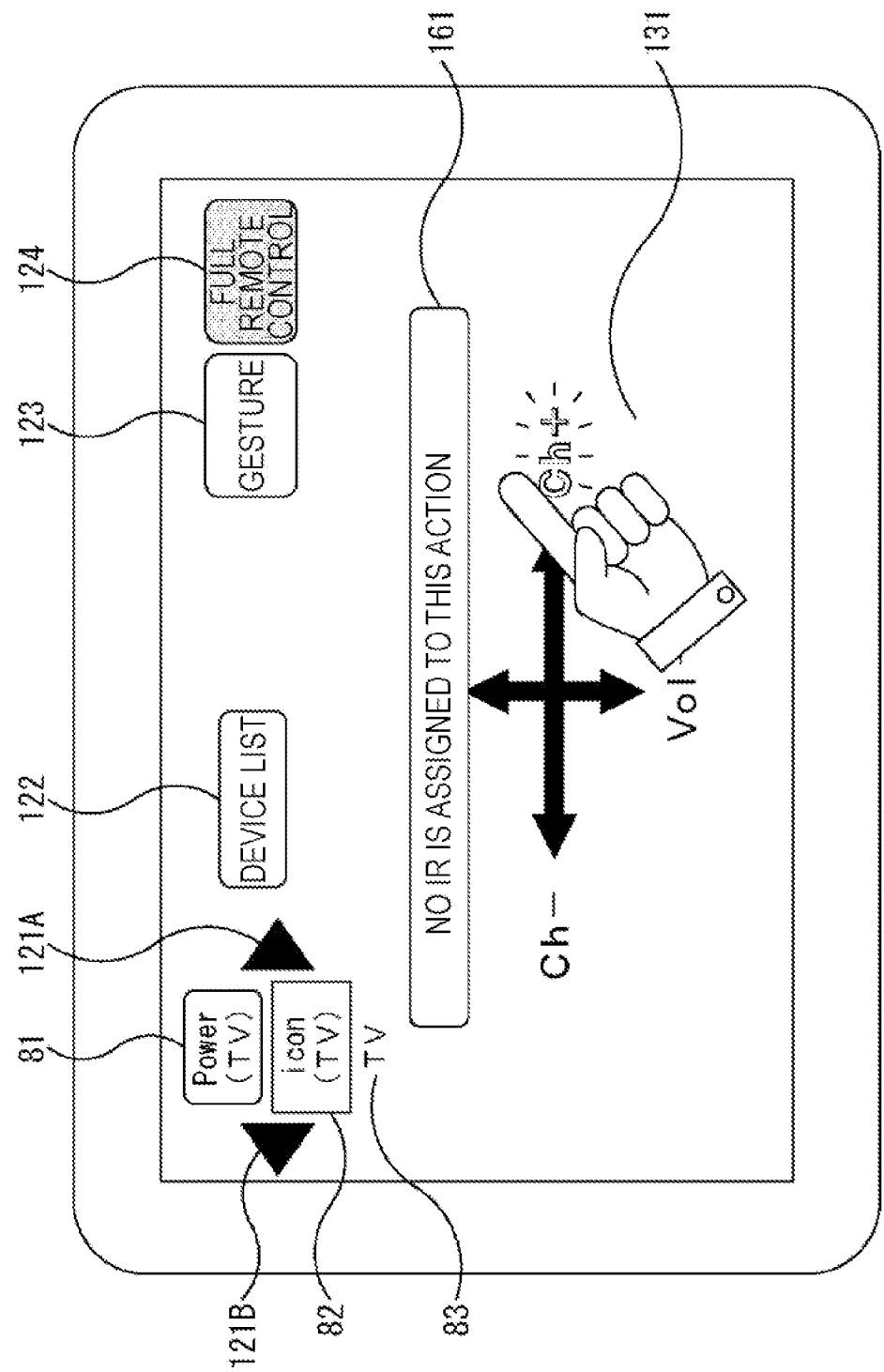
FIG. 15 is a diagram for explaining a command transmitting operation with a gesture motion.

Referring now to FIG. 15, an example display to be shown in a case where a gesture motion having no commands assigned thereto is made is described.

FIG. 15 shows an example display to be shown when the user performs a rightward flicking action in a case where any command for switching channels in the plus direction is not assigned to the remote control application.

When the user makes a gesture motion having no commands assigned thereto, the remote control application detects the gesture motion (flicking action) made by the user, and displays a message 161 in a toast pop-up window indicating that no commands are assigned to the detected gesture motion. A toast pop-up window is displayed for a predetermined period of time, and is then closed.

The remote control application also displays the portion (Ch+) of the recognized command in the gesture motion guide 131 in a blinking manner so that the user can see which command has been recognized even though the command is not assigned to the action. Since the command is not transmitted, the communication lamp 152 in FIG. 13 is not lighted.

[Flow of a Gesture Motion Responding Operation]

Figure 16:
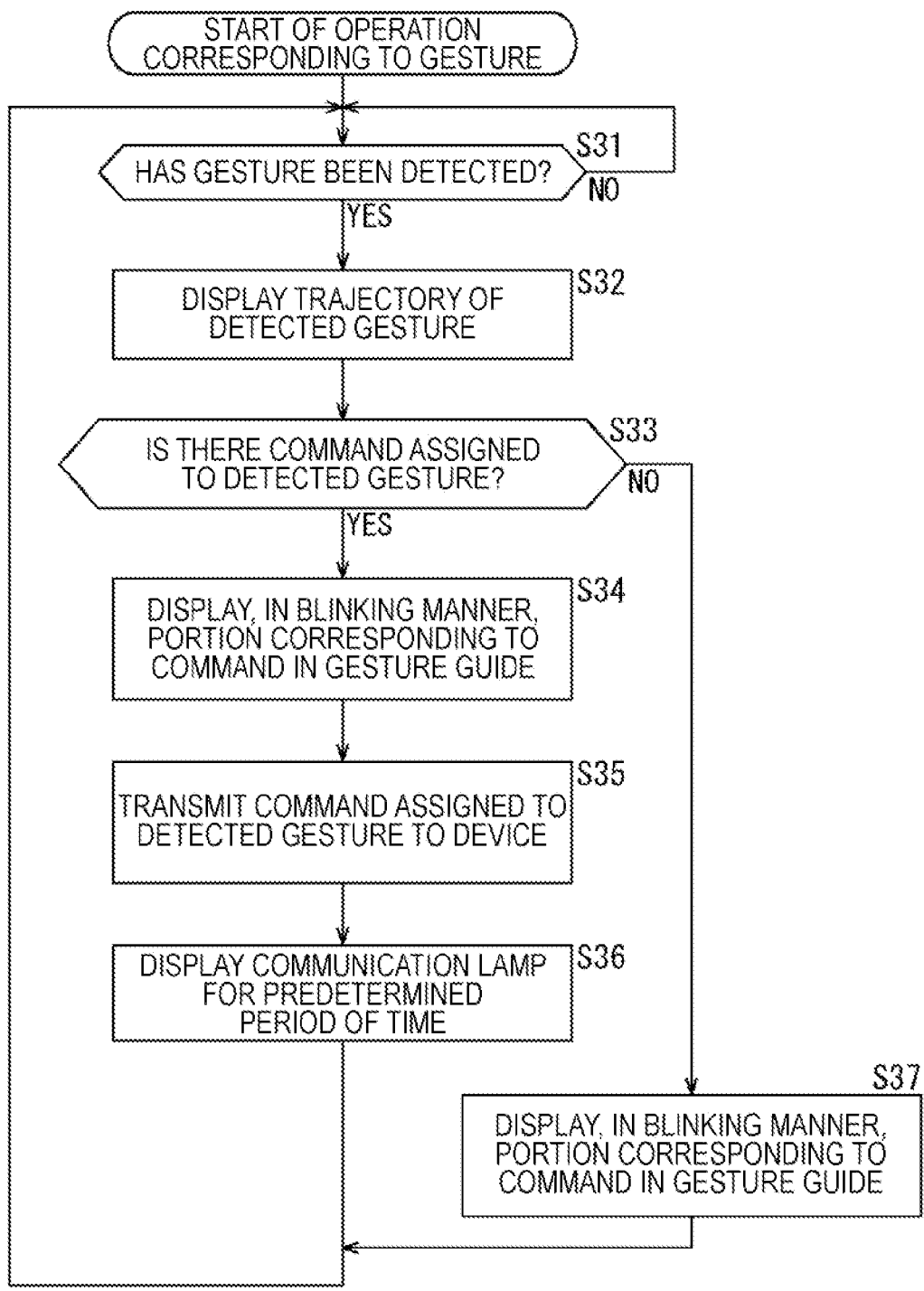
FIG. 16 is a flowchart for explaining an operation corresponding to a gesture motion.

FIG. 16 is a flowchart of a gesture motion responding operation to be performed as part of the user action responding operation of FIG. 3 by the remote control application.

First, in step S31, the remote control application determines whether a gesture motion has been detected, and repeats step S31 until determining that a gesture motion has been detected.

If it is determined in step S31 that a gesture motion has been detected, the operation moves on to step S32, and the remote control application causes the display unit 61A to display the trajectory 151 of the detected gesture motion (the position of a finger).

In step S33, the remote control application determines whether a command is assigned to the detected gesture motion.

If it is determined in step S33 that a command is assigned to the detected gesture motion, the operation moves on to step S34, and the remote control application displays, in a blinking manner, the portion corresponding to the command to be transmitted (Ch+ in the example shown in FIG. 13) in the gesture motion guide 131.

In step S35, the remote control application transmits the command (IR signal) assigned to the detected gesture motion to the control target device from the IR communication unit 12.

In step S36, the remote control application further displays, for a predetermined period of time, the communication lamp 152 indicating that a command is being transmitted.

In practice, steps S34 through S36 are carried out at the same time. After step S36, the operation returns to step S31.

If it is determined in step S33 that no commands are assigned to the detected gesture motion, on the other hand, the operation moves on to step S37, and only the same procedure as the above described step S34 is carried out. Specifically, the remote control application displays, in a blinking manner, the portion corresponding to the command to be transmitted (Ch+ in the example shown in FIG. 13) in the gesture motion guide 131. The operation then returns to step S31.

As described above, the remote control application causes the display unit 61A to display the gesture motion guide 131 in a first state. When a predetermined gesture motion is detected, the remote control application changes the portion corresponding to the command to be transmitted to a second state in the guide 131 corresponding to the detected gesture motion. In the above described example, the first state is a lighted state, and the second state is a blinking state. However, the first state and the second state are not limited to the above. For example, the first state may be a low-brightness (or dark) gesture motion guide 131, and the second state may be a high-brightness (or bright) gesture motion guide 131. The second state of the gesture motion guide 131 may be a reversed display with respect to the first state.

In this specification, the steps shown in the flowcharts are carried out in chronological order in accordance with the described sequence. However, those steps may not be carried out in chronological order, but may be carried out in parallel or be carried out when necessary such as when there is a call for them.

It should be noted that embodiments of the present technique are not limited to the above described embodiment, and various modifications may be made to it without departing from the scope of the present technique.

For example, although the display unit 61A displaying the device list screen and the like, and the position detecting unit 61B detecting gesture motions are superimposed on each other to integrally form the touch screen 11 in the above described embodiment, the display unit 61A and the position detecting unit 61B may be formed as structures independent of each other. For example, a touch pad as the position detecting unit 61B and the display unit 61A may be provided in different regions in the same plane, or may be formed in housings independent of each other.

It should be noted that the present technique can also be in the following forms.

(1)

A display control device including:

a display control unit that causes a display unit to display a guide for a gesture motion in a first state; and a detecting unit that detects the gesture motion, the display control unit changing the guide to a second state and causing the display unit to display the guide when the gesture motion is detected, the guide corresponding to the detected gesture motion.

(2)

The display control device of (1), wherein the gesture motion corresponds to a command for controlling a predetermined device, and the display control device further includes a communication unit that transmits the command corresponding to the detected gesture motion to the device.

(3)

The display control device of (2), wherein there is a plurality of guides for the gesture motion in accordance with categories of devices, the display control device further includes a selecting unit that selects a category of the device and a guide for the gesture motion, and the display control unit causes the display unit to display the guide selected by the selecting unit for the gesture motion in the first state.

(4)

The display control device of any of (1) through (3), further including the display unit.

(5)

A display control method including the steps of:

causing a display unit to display a guide for a gesture motion in a first state;

detecting the gesture motion; and changing the guide to a second state and causing the display unit to display the guide, the guide corresponding to the detected gesture motion.

(6)

A program for causing a computer to perform an operation including the steps of:

causing a display unit to display a guide for a gesture motion in a first state;

detecting the gesture motion; and changing the guide to a second state and causing the display unit to display the guide, the guide corresponding to the detected gesture motion.

REFERENCE SIGNS LIST

1 Tablet terminal, 11 Touch screen, 12 IR communication unit, 41 CPU, 61A Display unit, 61B Position detecting unit

The invention claimed is:

1. A display control device comprising:

a display control unit configured to cause a display unit to display a guide for a gesture motion in a first state;

a detecting unit configured to detect the gesture motion performed on the display unit at an area other than an area where the guide is displayed, wherein the display control unit is configured to change the guide to a second state and cause the display unit to display the guide in an event the gesture motion is detected, the guide corresponding to the detected gesture motion; and a communication unit configured to transmit a command corresponding to the detected gesture motion to a predetermined device, wherein the display control unit is configured to output an indicator indicating that the command corresponding to the detected gesture motion is being transmitted to the predetermined device.

2. The display control device according to claim 1, wherein the gesture motion corresponds to the command for controlling the predetermined device.

3. The display control device according to claim 1, wherein there is a plurality of guides for the gesture motion in accordance with categories of devices, the display control device further comprises a selecting unit configured to select a category of the predetermined device and the guide for the gesture motion, and wherein the display control unit is configured to cause the display unit to display the guide selected by the selecting unit for the gesture motion in the first state.

4. The display control device according to claim 1, further comprising the display unit.

5. A display control method comprising the steps of:

causing a display unit to display a guide for a gesture motion in a first state;

detecting the gesture motion performed on the display unit at an area other than an area where the guide is displayed;

changing the guide to a second state and causing the display unit to display the guide in an event the gesture motion is detected, the guide corresponding to the detected gesture motion;

transmitting a command corresponding to the detected gesture motion to a predetermined device; and outputting an indicator indicating that the command corresponding to the detected gesture motion is being transmitted to the predetermined device.

6. A non-transitory computer-readable storage medium having stored thereon, a set of computer-executable instructions for causing a computer to perform the steps comprising:

causing a display unit to display a guide for a gesture motion in a first state;

detecting the gesture motion performed on the display unit at an area other than an area where the guide is displayed;

changing the guide to a second state and causing the display unit to display the guide in an event the gesture motion is detected, the guide corresponding to the detected gesture motion;

transmitting a command corresponding to the detected gesture motion to a predetermined device; and outputting an indicator indicating that the command corresponding to the detected gesture motion is being transmitted to the predetermined device.

7. The display control device according to claim 1, wherein the second state represents a reversed display with respect to the first state.

8. The display control device according to claim 1, wherein the indicator is a communication lamp displayed on the display unit to indicate the transmission of the command to the predetermined device.

9. The display control device according to claim 1, wherein the indicator is an operation sound indicating the transmission of the command to the predetermined device.

\* \* \* \* \*